Jan. 29, 1935.  E. G. K. ANDERSON  1,989,393
SWITCH ENCLOSING BOX OR HOUSING
Filed Feb. 25, 1932  2 Sheets-Sheet 1
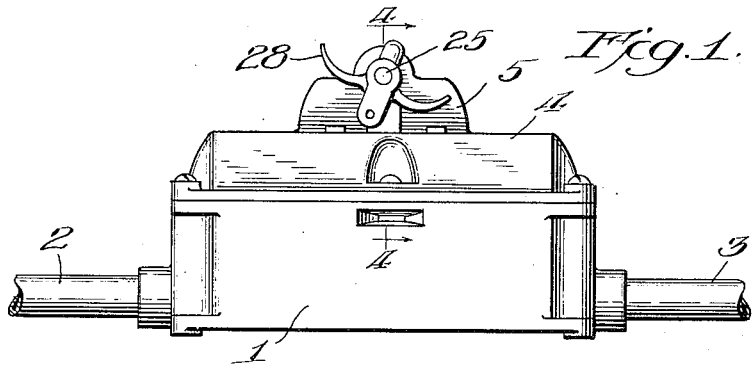
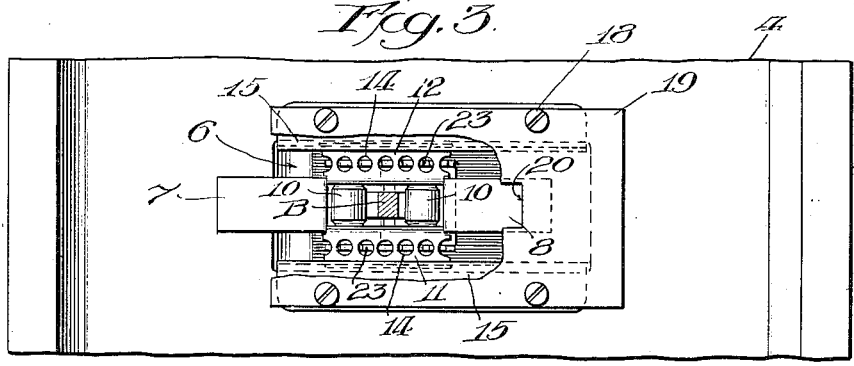
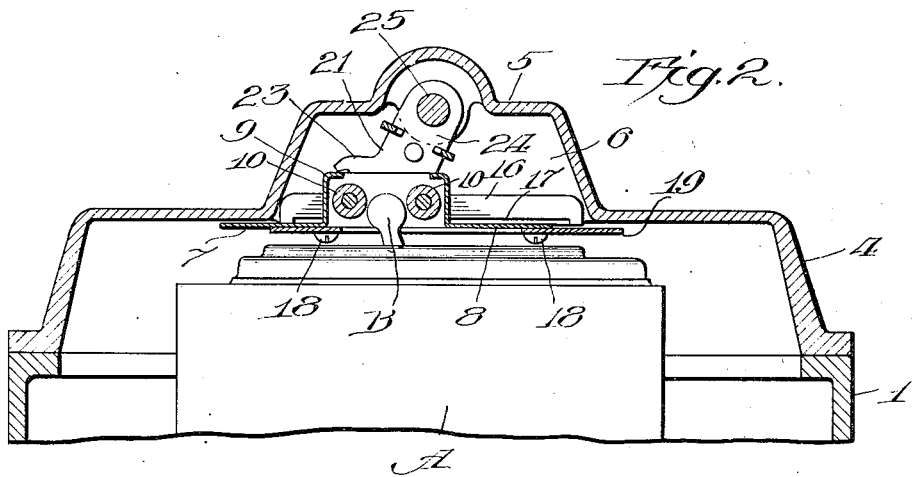
Inventor:
E. G. K. Anderson,
by Wm. F. Freudenreich,
Attys.

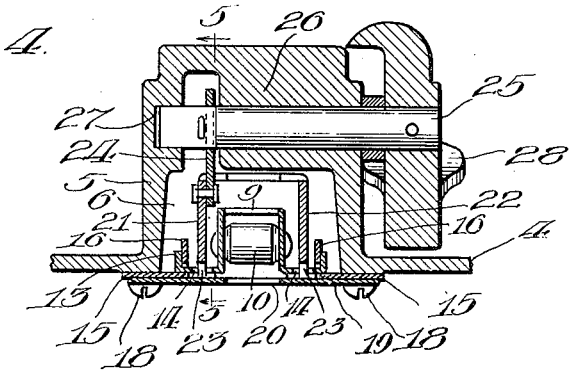
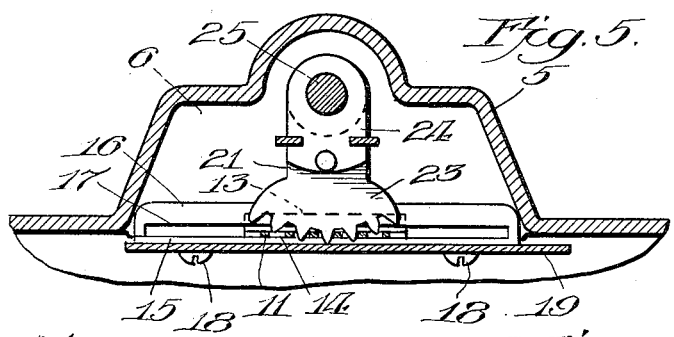
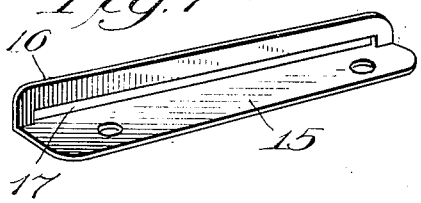
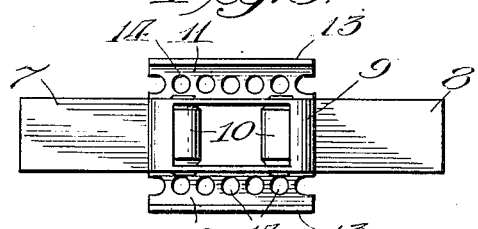
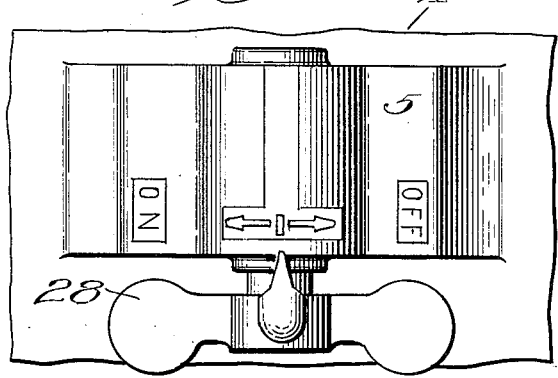
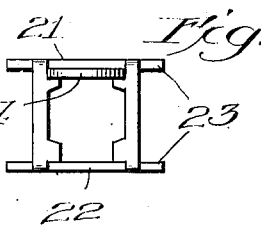

Patented Jan. 29, 1935

1,989,393

UNITED STATES PATENT OFFICE 1,989,393

SWITCH ENCLOSING BOX OR HOUSING

Ernst G. K. Anderson, Evanston, Ill., assignor to Appleton Electric Company, a corporation of Illinois Application February 25, 1932, Serial No. 595,160

6 Claims. (Cl. 200—172)

The present invention has for its object to produce a simple and novel structure adapted to form part of a conduit system for electric wiring, serve to house a circuit breaker or other switch in such a manner that flame created in the housing cannot escape to the surrounding atmosphere and provide means for cooperating with the handle or finger piece of the switch to permit the switch to be operated from the outside of the box.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side view of a box or housing embodying the present invention, together with fragments of conduits leading to and from the box or housing; Fig. 2 is a longitudinal central vertical section through the box or housing, on a much larger scale than Fig. 1, only a small portion of the body of the box being shown, and there being a switch in the box; Fig. 3 is a bottom plan view of the cover of the box, only the central panel of the cover being shown, and a part of the insulating sheet underlying the switch actuator being broken away; Fig. 4 is a section on line 4—4 of Fig. 1, on the same scale as Figs. 2 and 3, the switch actuator being shown in its neutral position intsead of in one extreme position as in Fig. 2; Fig. 5 is a section on line 5—5 of Fig. 4; Fig. 6 is a top plan view of that part of the box shown in Figs. 4 and 5; Fig. 7 is a perspective view of one of the supporting ledges and guides for the switch-actuating slide; Fig. 8 is a top plan view of the switch-alternating slide; and Fig. 9 is a top plan view of the slide-actuating rocker arm.

Referring to the drawings, 1 represents a box, open at the top, adapted to receive a complete circuit breaker or switch unit A, including a switch lever or finger piece B projecting upwardly therefrom. The switch device may be connected in a circuit including conductors entering and leaving the box through conduits 2 and 3. The top of the box is closed by a tightly fitting cover 4. The cover bulges upwardly at the center, as indicated at 5, to form a chamber or pocket 6 above the switch unit; the switch lever or handle B extending into this pocket.

Mounted on the cover so as to be reciprocable lengthwise thereof in a direction parallel with the plane of movement of the switch lever or handle B is a slide that is engaged with the switch lever or handle by the act of placing the cover in position on the box; whereby, upon moving the slide in one direction or the other, the switch will be opened or closed, as the case may be. The body portion of the slide may be formed of sheet metal suitably shaped and folded or bent to produce two aligned flat end pieces 7 and 8 integral with and lying on opposite ends of a housing 9 open at the top and at the bottom. In this housing are two rollers 10, 10 rotatable about parallel axes transverse of the slide and separated from each other in the direction of the length of the slide. The spacing between the rollers is such that the upper end of the switch lever may enter between the rollers so as to be engaged by one or the other when the slide is moved back and forth, and thus reduce the friction between the slide and the switch lever as the switch lever swings from one position to the other. On opposite sides of the housing 9 are laterally-projecting wings 11 and 12 each having at its long outer edge an upwardly-directed flange 13. Each wing is provided with a series or row of holes 14 extending lengthwise thereof. The slide is supported and guided by a pair of similar long angle plates each having one flange 15 underlying the cover beside the pocket and its other flange 16 projecting up into the pocket. A long slot 17 is cut in each of the flanges 16 flush with the corresponding flange 15, this slot extending from a point near one end of the angle plate to a point near the other end. The parts are so proportioned that, when the assembly is complete, with the wings on the slide extending through the slots 17 in the angle plates, the flanges 13 on the wings lie against the outer faces of the flanges 16 which thus serve as guides to hold the slide against lateral displacement. The angle plates may be held in place by means of screws 18 that pass through an underlying sheet 19 of insulating material and through the flanges 15 of the angle plates into the overlying portion of the cover. The end pieces 7 and 8 of the slide are preferably depressed below the plane of the wings so that in the assembly these end pieces are in the plane of the flanges 15 of the angle plates and, therefore, rest upon the top of the insulating piece 19. The member 19 is, of course, provided with an opening or window 20 through which the switch lever or handle extends.

The wings on the slide serve not only as supporting shoes but also, with their holes, as rack bars adapted to be engaged by suitable toothed elements to cause the slide to be reciprocated. In the arrangement shown, the toothed element is a piece of sheet metal bent into U-shape; the two arms of the U, 21 and 22, having at their free ends toothed segments 23 whose teeth are entered in the holes in the wings of the slide. This U-shaped device is fixed to one end of an arm or plate 24 fixed to and extending radially from an operating shaft 25. The shaft 25 extends through one of the side walls of the raised part of the cover 5, having a bearing in a long boss 26 that extends almost across the pocket or chamber in the member 5 at the top of the pocket; room being left between the free end of the boss and the opposite side wall to receive the lever arm or plate 24. The inner end of the shaft is preferably seated in a socket or recess 27 in the adjacent side wall, but does not extend through this wall. On the outer end of the shaft is a suitable finger piece device 28. It will be seen that, by providing a long bearing for the operating shaft for the slide, it will be substantially impossible for gases or flame to enter or leave the box or casing past or along the shaft.

Obviously, when the shaft is rocked by the finger piece or handle 28, the slide is reciprocated and carries the switch lever along with it. The swinging switch lever, of course, has a sliding movement relatively to the slide but, since the driving force is always transmitted to the switch lever through one or the other of the two rollers, there will be substantially no frictional resistance to such relative movements between the slide and the switch lever.

It will thus be seen that I have produced a simple and novel substantially air-tight box or housing for a switch device provided with means to operate the switch from without the housing; such means being placed in cooperative relation with the operating handle associated with the switch by the mere act of securing the cover upon the box or housing since the switch-actuating means carried by the box or housing is adapted to receive the handle or finger piece of any of the switches or small circuit breakers that are usually placed in the wiring systems of buildings. Consequently, my invention makes it possible effectively to isolate these switches and circuit breakers from the surrounding atmosphere, during the operation thereof, as well as at all other times, by simply placing them in my improved boxes and closing down the covers.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In combination, a box adapted to house a switch having an upwardly-projecting switch handle, a cover for the box having therein an upwardly-extending pocket into which the switch handle may enter, a slide mounted on the inner side of the cover across the mouth of the pocket for reciprocatory movements in or parallel with the plane of movement of the switch handle, a rock shaft extending through a side wall of the pocket, a toothed segment on the rock shaft within the pocket, elements on said slide cooperating with said toothed segment to cause the slide to be reciprocated when the shaft is rocked, and means outside of the box to rock the shaft.

2. In combination, a box adapted to house a switch, a cover for the box, said cover having an outwardly-extending pocket therein, one of the side walls of the pocket having a long boss extending therefrom to within a short distance of the opposite wall, a shaft extending through and journalled in said boss, a rocker arm fixed to the shaft beyond the free end of the boss, means cooperating with the rocker arm to move the handle of a switch in the box, and means outside of the box to turn the shaft.

3. In combination, a box adapted to house a switch, a cover for the box, said cover having an outwardly-extending pocket therein, a long boss integral with the cover and extending across the interior of said pocket from one of the side walls to within a short distance of the opposite side wall of the pocket, said boss having a cylindrical bore extending lengthwise through the same and through the first mentioned side wall, a shaft extending through and fitting rotatably in the said bore, a rocker arm fixed to the inner end of said shaft in the space between the inner end of the boss and the adjacent side wall, the lower end of said rocker arm being in the form of an inverted U, one arm and the cross piece of which underlie said boss, means on the outside of the box to turn the shaft, and means cooperating with the rocker arm and including a member fixed thereto and housed in the pocket below said boss to move the handle of a switch in the box.

4. In combination, a box adapted to house a switch having a projecting switch handle, a cover for the box having therein an outwardly-extending pocket adapted to overlie said switch handle, a slide mounted on the inner side of the cover across the mouth of the pocket for reciprocatory movements in or parallel with the plane of movement of the switch handle, an oscillatory toothed segment mounted in said pocket outwardly from the slide, elements on the slide cooperating with said toothed segment to cause the slide to be reciprocated when the shaft is rocked, elements on said slide to cooperate with the switch handle to cause the switch to be opened and closed when the slide is reciprocated, and means on the outside of the cover to oscillate said segment.

5. In combination, a box adapted to house a switch having an upwardly-projecting handle, a cover for the box having therein an upwardly-extending pocket into which the switch handle may enter, a slide mounted on the inner side of the cover across the mouth of the pocket for reciprocatory movements in or parallel with the plane of movement of the switch handle, said slide having an opening to receive said handle, a rock shaft extending horizontally through said pocket above said slide, an arm fixed to said rock shaft and terminating in a U-shaped device the arms of which lie on opposite sides of the opening in the slide, complementary elements on the free ends of the arms of the U device and on the slide to cause the slide to be reciprocated when the shaft is rocked, and means outside of the box to rock the shaft.

6. In combination, a box adapted to house a switch, a cover for the box, said cover having an outwardly-extending pocket therein, one of the side walls of the pocket having a long boss extending therefrom to within a short distance of the opposite wall, a shaft extending through and journalled in said boss, a rocker arm fixed to the shaft within the pocket beyond the free end of the boss, a slide mounted on the inner side of the cover across the mouth of the pocket and having therein a central opening to receive the handle of a switch in the box, elements on said rocker arm having a driving connection with said slide on opposite sides of the opening to cause the slide to be reciprocated when the shaft is oscillated, and means outside of the box to oscillate the shaft.

ERNST G. K. ANDERSON.